United States Patent [19]

Clark

[11] Patent Number: 5,691,836
[45] Date of Patent: Nov. 25, 1997

[54] OPTICALLY ADDRESSED SPATIAL LIGHT MODULATOR AND METHOD

[75] Inventor: Rodney L. Clark, Burley, Ala.

[73] Assignee: SY Technology, Inc., Huntsville, Ala.

[21] Appl. No.: 501,171

[22] Filed: Jul. 11, 1995

[51] Int. Cl.⁶ .................................................. G02F 1/03
[52] U.S. Cl. .......................... 359/247; 359/263; 359/291; 359/846
[58] Field of Search .................................. 359/290, 291, 359/846, 850, 247, 263

[56] References Cited

U.S. PATENT DOCUMENTS

| | | | |
|---|---|---|---|
| 4,737,621 | 4/1988 | Gonsiorowski et al. | 250/201 |
| 4,865,454 | 9/1989 | Lazzarini et al. | 356/359 |
| 5,170,269 | 12/1992 | Lin et al. | 359/9 |
| 5,216,537 | 6/1993 | Hornbeck | 359/291 |
| 5,285,308 | 2/1994 | Jenkins et al. | 359/260 |
| 5,396,364 | 3/1995 | O'Meara et al. | 359/292 |

Primary Examiner—Georgia Y. Epps
Assistant Examiner—Dawn-Marie Bey
Attorney, Agent, or Firm—Birch, Stewart, Kolasch & Birch, LLP

[57] ABSTRACT

An optically addressed spatial light modulator includes a reflective modulation element, a detector for detecting radiation, a micro-lens focusing a write beam on the detector and a read beam on the modulator element, and a circuit receiving a signal output from the detector generated in response to the write beam. The circuit alters the modulation element in accordance with the signal from the photodetector. The read beam is thus modulated in accordance with the amount of alteration of the modulation element. The read and write beams intercept the micro-lens at different angles and may have the same or differing wavelengths. Including multiple photodetectors on a single pixel allows use of a plurality of write beams. An array of the elements may be used to modulate a plurality of read beams.

15 Claims, 3 Drawing Sheets

OPTICALLY ADDRESSED SPATIAL LIGHT MODULATOR AND METHOD

BACKGROUND OF THE INVENTION

1. Technical Field of the Invention

The present invention relates to an optically addressed spatial light modulator. More particularly, the present invention relates to a spatial light modulator addressed using a micro-lens and providing modulation by electrostatically changing the shape of a reflective element.

2. Description of Related Art

Devices presently used for optical signal processing, optical computing, optical interconnects, optical wavelength correction and correction of aberrations of optical fields include liquid crystal spatial light modulators, photo refractive volume holograms, and magneto-optic, spatial light modulators. Spatial light modulators (SLMs) provide amplitude or phase encoding on a two dimensional wavefront. In most SLMs, the devices are limited to operational frequencies in the kilohertz range for most liquid crystal devices and the megahertz range for binary ferro-electric devices. Liquid crystal devices are also temperature sensitive.

Another type of modulator, known as the deformable mirror device (DMD), uses a micro-mechanical concept to phase modulate the incident light. The DMD is an electronically addressed scheme which has a wide dynamic range in its phase response, but is limited to kilohertz modulation frequencies. Conventional DMDs attempt to utilize as much of the available pixel area as possible in order to achieve a high fill factor to assure a high optical efficiency. Fill factor is defined as the area of each micro-mirror divided by the total pixel area. Large pixel fill factors with large mirror elements have a slow response and do not provide space for additional elements on the pixel.

Current addressing techniques are typically electronic, requiring shift registers and complicated data protocols for efficient addressing. A computer must process an image from a charge coupled device (CCD) camera before it transfers data back to the SLM via an electrical data bus. In optical signal processing, however, it is redundant to convert light to a transient digital signal and back to light again. In the current technology of optical addressing for reflective devices, the addressing is performed by simply flooding the device with light; i.e., both the photodetector sites and the modulator sites are illuminated. This causes a large part of the incident energy to be wasted in the dead space between the pixels and induces pixel crosstalk. This also results in a low signal-to-noise ratio degraded sensitivity and a limited dynamic range.

SUMMARY OF THE INVENTION

Accordingly, it is a primary object of the present invention to improve upon the characteristics of the previously employed processing devices mentioned above. In particular, it is an object of the present invention to provide an efficient SLM for performing a variety of computing functions at a very high data rate, resulting in improvement in the speed of computation. Such computing functions include image filtering, image multiplication, thresholding and addition. These functions are useful in many fields including optical signal processing, optical computing, optical interconnects, optical wavefront correction, and corrections of aberrations of optical fields.

It is another object of the present invention to provide a SLM having optical inputs and outputs in a configuration suitable for optical computing circuits with the input addressing being performed from the front surface of the device using a micro-lens array.

These and other objects of the present invention are fulfilled by providing an optically addressed spatial light modulator including a reflective modulator element, a detector for detecting incident radiation, a unit focusing a write beam on the detector and a read beam on the modulator element, and a circuit receiving a signal output from the detector generated in response to the write beam. This circuit alters a modulation characteristic of the modulator element in accordance with the signal from the detector. The read beam is thus modulated in accordance with the amount of alteration of the modulator element. The focusing unit advantageously includes a micro-lens focusing the write beam on the detector and the read beam on the modulator element. The modulator element advantageously includes a metallic mirror above a conductor, the modulation characteristic thus being the position of the metallic mirror above the conductor, and the circuit alters the mirror position by injecting a charge output by the circuit in response to the photodetector signal into the conductor. The read and write beams intercept the focusing unit at different angles from one another and may have the same or differing wavelengths.

A further scope of applicability of the present invention will become apparent from the detailed description given hereinafter. However, it should be understood that the detailed description and the specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
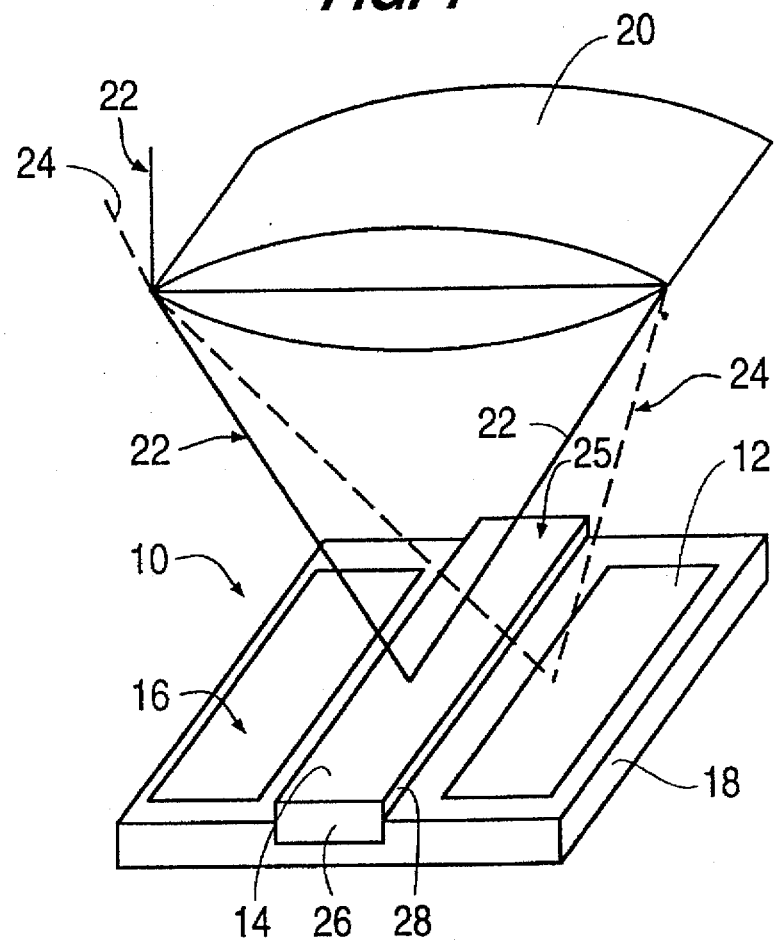
FIG. 1 is an elevational perspective view of a single pixel of the spatial light modulator of the present invention in conjunction with a micro-lens.
Figure 2:
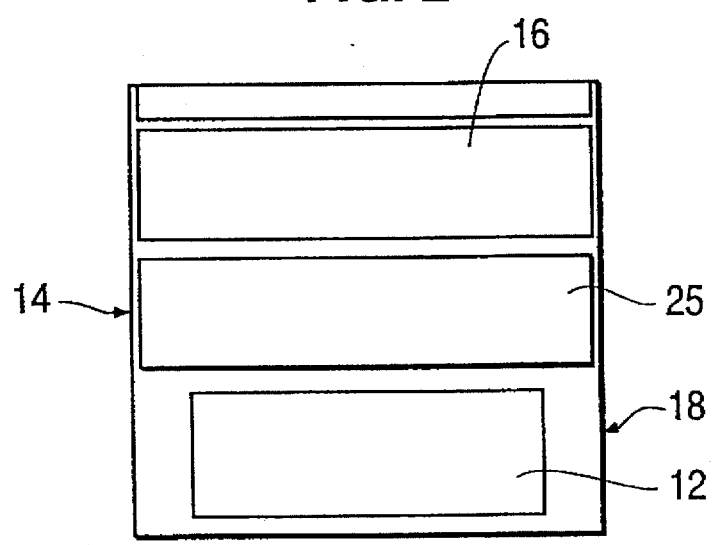
FIG. 2 is a top view of the spatial light modulator shown in FIG. 1.

FIGS. 1 and 2 illustrate a single pixel of the spatial light modulator of the present invention. Each pixel consists of a photodiode 12, a modulator element 14, and a micro-circuit 16, formed on a substrate 18. Each pixel site also has a micro-lens 20 associated with it. The photodiode 12 includes a circuit to adjust its gain and offset. The gain and offset adjustment of the photodiode 12 may be included in the micro-circuit 16. The micro-circuit 16 converts a charge output by the photodiode 12, which converts the light to electrons, into a voltage, amplifies the voltage and drives the modulator element 14. The micro-circuit 16 is typically powered by an external voltage between ±15 volts.

The modulator element 14 consists of a metallic mirror surface 25 mounted above the substrate 18 by mounting units 26 located on either end of the metallic mirror 25. These mounting units 26 are preferably made of the same material as that of the metallic mirror 25. The modulator element 14 also includes a flat conductive plate positioned on the substrate 18 under the metallic mirror 25. The flat conductive plate 28 has nearly the same width and length as the metallic mirror 25; but due to mounting units 26, it will be slightly shorter.

A micro-lens 20 couples light to the SLM 10. The optical input to the SLM 10 is incident on the micro-lens 20 at an angle away from normal and serves as the write beam 24. This write beam 24 is focused by the micro-lens array onto the photodiode 12. A read beam 22, which is normally incident on the micro-lens 20, is focused onto the modulator element 14. The optical output of the SLM 10 will be the reflected light beam from the modulator element 14, the output beam having been modulated thereby. The micro-lens 20 used with the SLM 10 having the correct pixel pitch, focal length and waveband of operation will address the device pixel by pixel.

Ideally, the metallic mirror would be flat when deflected, but in practice, it is somewhat curved. Thus, the micro-lens 20 needs to focus the read beam on a small region in the center of the metallic mirror 25 in order to minimize the effects of curvature on performance. The micro-lens 20 needs to form the focus spot on the metallic mirror 25 which is not significantly degraded by defocusing over the range of travel of the metallic mirror 25 through the distance above the substrate 18. In other words, the focus spot size must be no greater than the width of the metallic mirror 25 over the range of travel of the metallic mirror 25, i.e., there is sufficient depth of focus. A greater spot degradation can be tolerated for the write beam 24 on the photodiode 12.

After the photodiode 12 has received the write beam 24, the micro-circuit 16 converts the charge output by the photodiode into a voltage, amplifies this voltage, and injects the charge under the modulator element The flat conductive plate 28 located underneath the metallic mirror 25 receives the charge output from the micro-circuit 16 in order to deflect or repel the metallic mirror 25 in response to the charge injected by the micro-circuit 16. The signal output from each photodiode 12 is a function of the transfer characteristics of the pixel micro-circuitry 16. The output voltage range will be designed to optimize the deflecting ribbon and/or modulating medium 25. For example, the deflection may be calculated as follows:

Deflection=Gain * R * K * P where

Gain—circuit gain (typical—100)

R—load resistance (typical 1000 ohms)

K—SLM deflection constant (typical—100 nm/Volt)

P—optical power (typical—5 µWatts)

In designing the deflection range, all of these values are variables to the designer so that an optical configuration is achieved.

Figure 3A:
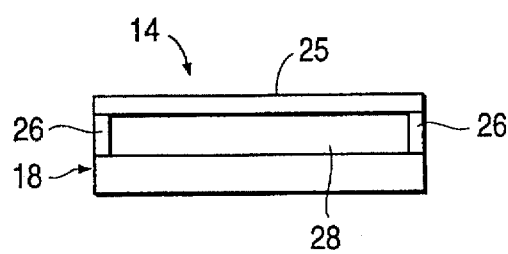
FIG. 3A is a side view of the spatial light modulator shown in FIG. 2 with the mirror in the undeflected position.
Figure 3B:
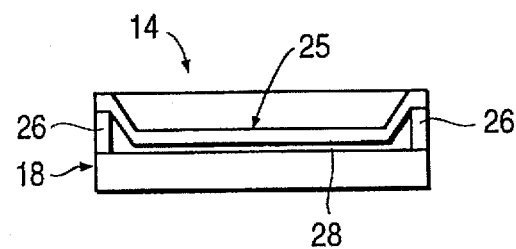
FIG. 3B is a side view of the spatial light modulator shown in FIG. 2 with the mirror in a deflected position

An example of such a deflection due to the electrostatic force induced by the injected charge from the micro-circuit 16 can be seen in FIGS. 3A and 3B. In FIG. 3A, no charge is applied to the conductive plate and the metallic mirror 25 remains level supported by its mounting units 26. In FIG. 3B, the charge has been applied to the conductive plate 28 by the micro-circuit 16 in response to the sensing of the write beam 24 by the photodiode 12, and the metallic mirror 25 is attracted to the conductive plate 28.

In such a micro-mechanical modulation scheme, the only limiting factors of the operational frequency of the dimensions and thickness of the metal mirror 25. These operational frequencies for arrays of metallic strips are in excess of 1 megahertz. The dynamic range is represented by the deflection range between the undeflected position of the metallic mirror 25, shown in FIG. 3A, and the substrate 18, and may be selected to be one-half of a wavelength of interest such that upon reflection at the furthest deflection of the metallic mirror 25, a full $2\pi$ radian, or one complete cycle, phase shift upon reflection may be achieved. For visible light, this would result in the metallic mirror being mounted 300 nanometers above the substrate 18. Alternatively, the metallic mirror may be situated some other desired multiple of a fraction of the wavelength, e.g., $m\lambda/4$, where m is an integer. Upon deflection or repulsion of the metallic mirror 25 by the conductive plate 28, a modulated read beam is output from the device.

There are numerous alternatives as to the type of micro-lens and the type of material used for the metallic mirror 25 depending upon the type of modulation and the type of application desired. Advantageously, the metallic mirror 25 may be made of the same material as that of transistor gates of the micro-circuit 16. For example, the metallic mirror 25 may be made out of either polysilicon or a poly silicon/silicon nitride sandwich with a layer of metal deposited on top. The conductive flat plate 28 under the metallic mirror 25 is also advantageously made of poly silicon. If intensity modulation of the output light is desired, the metallic mirror 25 may consist of silicon/silicon nitride without a layer of metal being deposited on top.

Figure 4A:
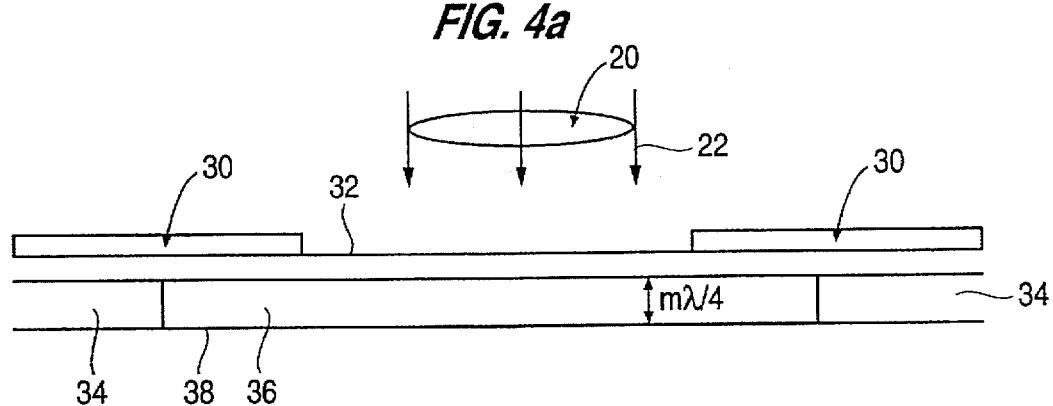
FIG. 4A is a side view of another embodiment of the spatial light modulator with the modulating surface in the undeflected position.
Figure 4B:
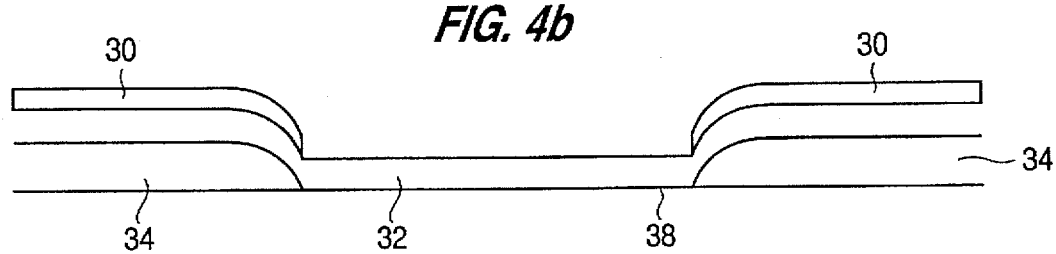
FIG. 4B is a side view of the spatial light modulator shown in FIG. 4A with the modulating surface in a deflected position.

In order to perform intensity modulation, the reflecting surface can be removed from the $SiN_x$ layer. The required intensity modulation may be obtained from the specific embodiment illustrated in FIGS. 4A and 4B. This modulation technique was presented in "Silicon Modulator Based on Mechanically-Active Anti-Reflection Layer with 1 Mbit/sec Capability for Fiber-in-the-loop Application", IEEE Photonics Letters, Vol. 6, No. 9, September 1994, pages 1119–1121. In this embodiment, the read beam 22 is focussed by a micro-lens 20 onto a thin, e.g., having a thickness of $\lambda/4$, layer of $SiN_x$ 32. The $SiN_x$ 32 is supported above a substrate of doped silicon 38 by opposing layers 34 of silicon dioxide having the desired thickness, e.g., $m\lambda/4$, of the air gap 36 to be formed when the layer 32 is in the undeflected position, as shown in FIG. 4A. Opposing electrodes 30 extend beyond the supporting layers 34 such that when the electrodes are biased in order to reduce the air gap 36, they will be able to easily move the layer 32 down towards the substrate 38. Upon full deflection, as shown in FIG. 4B, the air gap 36 will disappear. Other modulating schemes can also be implemented into pixilated structure providing they can be driven by available on chip modulating voltages.

In an exemplary embodiment, each pixel 10 is approximately 40×40 µm and the metallic mirror 25 is 40 µm in length and 9 µm wide. These dimensions are not critical to the operation and can be either much larger or much smaller depending on the requirements of an application and the capabilities of the equipment used for fabrication. The length and width of the metallic mirror strip are not critical, but altering these dimensions will change the performance of the device, especially regarding frequency response and the practical ability of the micro-lens to provide sufficient focus.

The micro-lens 20 may be made of any suitable optically transparent material, including optical glasses, crystals, and plastics. The micro-lens may be cylindrical or spherical, depending on the desired shape of the spot. For monochromatic operation, the micro-lens can be a diffractive optical element. For broadband applications, a refractive micro-lens is preferred. Combinations of diffractive and refractive micro-lens elements may be used to achieve achromatization.

The optical input write beam 24 is intensity modulated with a signal. This signal can be either analog or digital depending on the application. The light source for the write beam 27 can be from a laser, a light emitting diode, an interference pattern, an optical image formed at a focal point of an optical system, another SLM or any other source of light. The optical input may include more than one beam, the sum of which is used to modulate the read beam. Using more than one write beam and multiple detectors is useful in image addition, matrix or vector addition, interference nulling of a desired signal, etc.

The nature of the output light beam from the device will be a function of the device application. If it is desired to phase modulate a coherent light beam, a coherent read beam 22 will be applied to the device. If wavefront correction is the desired result, the conjugate of the disturbed wavefront will be applied to the modulator for phase compensation.

The wavelengths of the read and write beams may or may not be the same, also depending on the application. For wavefront correction these wavelengths would most likely be the same, since a portion of the light of the aberrated wavefront would be used to write the correction magnitude to the SLM 10. However, in other optical computing applications, they need not be the same, since the read beam and the write beam are directed to different sites on the pixel.

Figure 5:
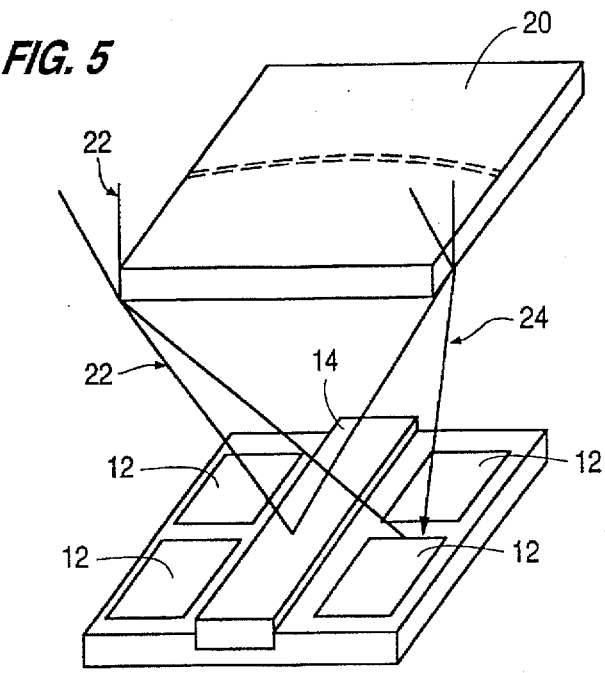
FIG. 5 is an elevational perspective view of another embodiment of a single pixel of the spatial light modulator of the present invention in conjunction with a micro-lens.
Figure 6:
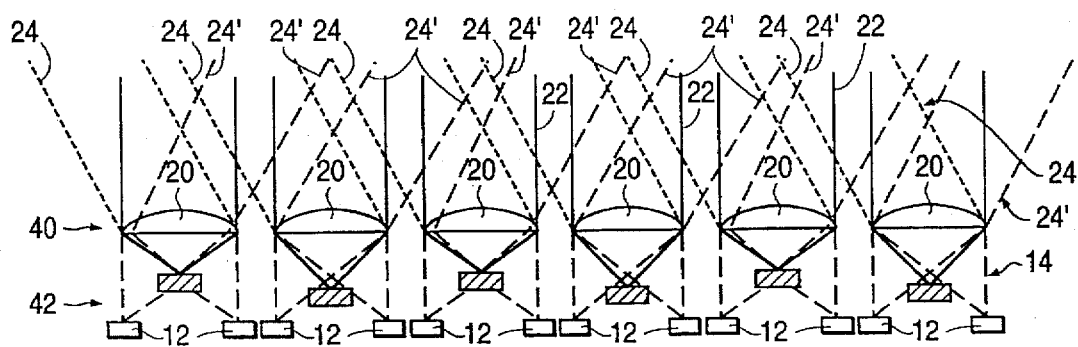
FIG. 6 is a schematic side view of an array of pixels shown in FIG. 5 with an array of micro-lenses.

Other embodiments of the present invention can incorporate more than one photodiode 12 per pixel 10, as shown in FIG. 5. The output signal of each photodiode can be input to an analog micro-circuit for even more complex operations. The micro-circuitry may be interposed between the various photodetectors 12 and the modulating element 14. Multiple write beams can be used to address multiple photo active areas 12 per pixel 10 as illustrated in FIGS. 5 and 6. The spatial multiplexing can be achieved through angular addressing as is the case for the single photo detector design. This angular multiplexing is realized through the imaging of the micro-lens 20 from multiple source locations, as shown in FIG. 6.

The micro-lenses 20 are fabricated into an array 40 with a pixel pitch identical to that of the array 42 of SLMs 10. The micro-lens array 40 is fabricated on a thin dielectric substrate approximately the same dimensions as the substrate for the SLM array (on the order of 1 square centimeter). Alignment marks are etched on both the micro-lens array 40 substrate and the SLM array 42 substrate during fabrication. The micro-lens array 40 is supported and precisely positioned above the SLM array 42 with spacers around its perimeter. After optically aligning the two substrates with respect to each other, which precisely positions each micro-lens 20 directly above its corresponding SLM pixel 10, the micro-lens array 40 is glued in place with optical cement around its perimeter.

An array 40 of micro-lenses 20 matches the modulator active area, i.e., the photodiode 12 and the modulator element 14, to the focus spot size for a maximum signal to noise ratio. FIG. 6 shows a one dimensional slice through the modulator. In this case, the read beam strikes the modulator at normal incidence. The beam is pixilated into multiple pixels by the lenslet array. Each beam portion is focused onto a micro-mirror 14, which are shown at various degrees of deflection. The beams are reflected by the micro-mirrors 14 and reformed into the modulated read beam which exits at normal reflection angle.

The write beams 24, 24' strike the modulator at some appropriate incident angle such that the beams formed upon pixilation by the micro-lens 20 miss the micro-mirrors 14, but strike the appropriate photodetector 12 and are absorbed.

Thus, the integrated micro-lens and reflective SLM of the present invention can be used to more directly modulate light beams using light as the modulating input. Such a device has a signal to noise ratio, and the operational frequency of such a device is limited by the speed of the deflector mirror. The present device also eliminates the redundant processing of the analog-to-digital data conversions. The present device also uses multiple incident angles on a micro-lens to allow optical addressing to different portions of the pixel.

A possible use for the phase modulator of the present invention include phase correction, in which a previously aberrated wavefront having a non flat phase, having been distorted by a phase distorting media such as the atmosphere, can be sensed by a phase sensing device. The data obtained from the phase sensor can be used to drive the modulator of the present invention, in such a way as to correct the aberrated wavefront and obtain the original unaberrated wavefront.

Another use is for optical computing in which the modulator of the present invention can be used as a phase filter in a Vandelug phase only optical correlation device. In this pattern recognition application, an input image is first optically Fourier transformed. The transform is reflected from the modulator device. The reflected wavefront is inverse Fourier transformed optically and the result is made to strike a focal plane camera. The presence of a strong correlation signal signifies that the input image has been recognized as being very similar to the phase encoded image placed upon the modulator device of the present invention.

The invention being thus described, it would be obvious that the same may be varied in many other ways. Such variations are not to be regarded as a departure from the spirit and scope of the invention, and also as modifications as would be obvious to one skilled in the art are intended to be included within the scope of the following claims.

What is claimed is:

1. An optically addressed spatial light modulator comprising:

a reflective modulator element including a metallic strip mounted above a conductor;

a detector for detecting incident radiation;

a focusing unit which focuses a write beam on said detector and a read beam on said reflective modulation element; and a circuit receiving a signal output from said detector generated in response to said write beam and altering a modulation characteristic of said reflective modulator element in accordance with said signal, said read beam being modulated in accordance with an amount of alteration of said reflective modulator element, wherein said modulation characteristic is a position of said metallic strip above said conductor, and said circuit alters said position by injecting a charge output in response to said signal into said conductor.

2. The optically addressed spatial light modulator as recited in claim 1, wherein said focusing unit comprises a micro-lens.

3. The optically addressed spatial light modulator as recited in claim 1, wherein said read beam and said write beam are incident on said focusing means at different angles.

4. The optically addressed spatial light modulator as recited in claim 3, wherein said read beam is normally incident on said focusing means.

5. The optically addressed spatial light modulator as recited in claim 1, wherein said read beam and said write beam have the same wavelength.

6. The optically addressed spatial light modulator as recited in claim 1, wherein said read beam and said write beam have different wavelengths.

7. The optically addressed spatial light modulator as recited in claim 1, wherein said detector comprises a plurality of photodetectors for detecting a corresponding plurality of write beams.

8. The optically addressed spatial light modulator as recited in claim 1, wherein said reflective modulator, said detector, and said circuit are integrated into a single pixel.

9. The optically addressed spatial light modulator as recited in claim 8, further comprising a plurality of said single pixels and a corresponding array of said focussing means.

10. The optically addressed spatial light modulator as recited in claim 9, wherein said focussing means comprises a micro-lens array having a pixel pitch equal to a pixel pitch of an array formed by said single pixels.

11. The optically addressed spatial light modulator as recited in claim 9, wherein each of said focussing means receives a corresponding read beam.

12. A method of spatially modulating light, comprising the steps of:

focusing an input write beam only onto a photodetector via a focusing unit;

focusing a read beam only onto a reflective modulator element via said focusing unit;

converting a signal output from said photodetector into a charge injection signal;

deforming said reflective modulator element in accordance with said charge injection signal, said deforming step including injecting said charge injection signal into a conductor of said reflective modulator element, and deflecting a metallic mirror of said reflective modular element in accordance with a charge on said conductor; and outputting a modulated read beam reflected from a deformed reflective modulator element.

13. The method as recited in claim 12, further comprising, prior to said focusing steps, intercepting said read beam and said write beam at different angles on a micro-lens of said focusing unit.

14. The method as recited in claim 12, wherein said input write beam focussing step further comprises focussing a plurality of write beams onto a corresponding plurality of photodetectors.

15. The method as recited in claim 12, wherein said read beam focussing step comprises focussing a plurality of read beams onto a corresponding plurality of reflective modulator elements.

* * * * *